United States Patent Office 3,415,829
Patented Dec. 10, 1968

3,415,829
6-PHENYL DECAHYDROQUINOLINES
Raymond Bernasconi, Oberwil, Basel-Land, and Karl Schenker, Binningen, Switzerland, assignors to Ciba Corporation, New York, N.Y., a corporation of Delaware
No Drawing. Filed Sept. 14, 1965, Ser. No. 487,296
Claims priority, application Switzerland, Sept. 18, 1965, 12,180/64
21 Claims. (Cl. 260—286)

ABSTRACT OF THE DISCLOSURE

Compounds, such as 6-cyano-6-phenyl-decahydroquinoline, of the formula

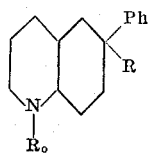

in which Ph is an optionally-substituted phenyl radical, R is a —C≡N, esterified carboxyl or acyl radical, and $R_o$ is a hydrogen or an optionally-substituted hydrocarbon radical. The compounds are useful as antitussives and analgesics.

---

The present invention relates to new quinoline compounds. Especially it concerns 6-R-6-R′-decahydroquinolines, in which R represents the cyano group, and esterified carboxyl group or an acyl radical and R′ a phenyl radical, and their salts.

In the new compounds the acyl radical is, for example, the radical of an alkanecarboxylic acid, preferably of a lower alkanecarboxylic acid such as the acetyl, propionyl, butyryl or caproyl radicals. An esterified carboxyl group is, for example, a carboxyl group esterified with an alkanol, such as a carbalkoxy group, preferably a lower carbalkoxy group such as a carbomethoxy, carbethoxy or carbopropoxy group.

The phenyl radical in position 6 may be unsubstituted or it may contain one, two or more substituents. Particularly suitable relevant substituents are lower alkyl radicals, lower alkoxy groups, halogen atoms or trifluoromethyl groups.

The new decahydroquinolines may contain further substituents, more especially lower alkyl radicals or benzyl radicals, for example on the cyclic nitrogen atom in position 1.

Lower alkyl radicals are, for example, methyl, ethyl, propyl or isopropyl groups; or straight or branched butyl, pentyl or hexyl groups which may be linked in any desired position. Lower alkoxy groups are especially methoxy, ethoxy, propoxy, butoxy or pentyloxy groups and particularly suitable halogen atoms are fluorine, chlorine or bromine atoms.

The new compounds possess valuable pharmacological properties, especially as antitussives. This can be demonstrated for example on the pigeon as a selective inhibition of the cough reflex. Furthermore, the compounds have an analgesic effect and are morphine antagonists. They are therefore useful as antitussives or as analgesics. They are also suitable for use as intermediates for the manufacture of medicaments.

Special mention deserve the compounds of the formula

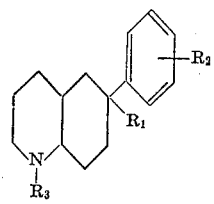

in which $R_1$ represents a lower alkanoyl radical, a lower carbalkoxy group or especially the cyano group, $R_2$ represents a lower alkyl radical, a lower alkoxy radical, a halogen atom, a trifluoromethyl group or especially a hydrogen atom, and $R_3$ represents a lower alkyl radical or especially a hydrogen atom, particularly the corresponding trans-compounds.

Particularly effective is the trans-6-carbethoxy-6-phenyl-decahydroquinoline and especially as antitussive the trans-6-cyano-6-phenyl-decahydroquinoline.

The new compounds are manufactured by known methods.

Preferably, a 2-(γ-$R_x$-propyl)-4-R-4-R′-cyclohexanone (in which $R_x$ stands for an amino group containing at least one hydrogen atom, for example a free or monoalkylated amino group, and R and R′ have the above means) is subjected to intramolecular condensation and reduction and, if desired, substituents are introduced at any stage of the process.

The condensation and the reduction are performed in the customary manner. The reduction may be carried out, for example, with nascent hydrogen, for example with a dilight metal hydride such as sodium boron hydride or with catalytically activated hydrogen, such as hydrogen in the presence of a hydrogenating catalyst, such as a nickel or palladium catalyst for example Raney nickel or palladium carbon.

Substituents can be introduced or eliminated in a resulting compound. Thus, for example, a resulting compound that is unsubstituted on the nitrogen atom in position 1 of the quinoline ring may be N-substituted, for example alkylated or benzylated.

The substitution referred to above is performed in the usual manner, for example by reaction with a reactive ester of a suitable alcohol, or by reductive alkylation, that is to say by reaction with a suitable oxo compound followed by reduction. Reactive esters are e.g. esters with strong organic or inorganic acids, for example hydrohalic acids such as hydrochloric or hydrobromic acid, or arylsulfonic acids such as a para-toluene-sulfonic, para-bromobenzenesulfonic or benzenesulfonic acid. A preferred reducing agent is catalytically activated hydrogen or formic acid.

Furthermore, in a resulting compound substituents R may be converted into one another. Thus, for example, cyano groups may be alcoholyzed, preferably by reaction with an alcohol in the presence of a strong acid, for example a mineral acid such as sulfuric acid, and advantageously in the presence of ammonium chloride.

Furthermore, cyano groups can be converted into acyl radicals in the known manner, for example by reaction with a reagent of the formula $R_oMgHal$, where $R_o$ stands for a possibly substituted hydrocarbon radical, for example an alkyl radical, and Hal represents a halogen atom such as chlorine, bromine or iodine. The reaction is carried out in the usual manner.

If desired, a 1-unsubstituted decahydroquinoline may be acylated in position 1 before proceeding to the reactions mentioned above, for example it may be lower-alkanoylated, benzoylated or carbobenzoxylated. The acylation is performed in the usual manner, for example by reaction with a reactive functional acid derivative, such as an acid chloride or anhydride.

Resulting 1-benzyl or 1-carbobenzoxy compounds can be split again by hydrogenolysis in the usual manner after having performed the desired conversions. A resulting 1-acyl compound can be split by a conventional hydrolysis.

Depending on the reaction conditions and starting materials used the final products are obtained in the free form or in the form of their salts which are likewise included in the present invention. The salts of the final products can be converted into the free bases in the known manner, for example with alkalies or ion exchange resins. Reaction of the free base with an organic or inorganic acid, especially one that is capable of forming therapeutically acceptable salts, furnishes salts. As such acids there may be mentioned, for example, hydrohalic acids, sulfuric and phosphoric acids, nitric and perchloric acid; aliphatic, alicyclic, aromatic or heterocyclic carboxylic or sulfonic acids, such as formic, acetic, propionic, succinic, glycollic, lactic, malic, tartaric, citric, ascorbic, maleic, hydroxymaleic or pyruvic acid; phenylacetic, benzoic, para-aminosalicylic, embonic, methanesulfonic, ethanesulfonic, hydroxyethansulfonic, ethylenesulfonic, halogenobenzenesulfonic, toluenesulfonic, naphthalenesulfonic or sulfanilic acid; methionine, tryptophan, lysine or arginine.

The above-mentioned and other salts of the new compounds, for example the picrates, may also be used for purifying the free bases obtained, by converting the free base into a salt thereof, separating the salt and isolating the free base again from it. In view of the close relationship between the new compounds in the free form and in the form of their salts what has been said above and below with reference to the free bases refers also to the salts wherever this is possible and suitable.

The invention includes also any modification of the present process in which an intermediate obtained at any stage of the process is used as starting material and any remaining step/steps is/are carried out, or in which the starting materials are formed in situ or if desired, the reactants are used in the form of their salts.

Thus, for example, a 2-(β-cyanoethyl)-4-R-4-R'-cyclohexanone (in which R' and R have the above meanings) may be reduced; at first, the β-cyanoethyl group is reduced to the γ-aminopropyl group which is then subjected to the intramolecular condensation according to the invention to yield the Schiff's base and the latter is then reduced to the decahydroquinoline. The reduction is performed in the known manner, preferably by treatment with hydrogen in the presence of a hydrogenating catalyst, such as a nickel or palladium catalyst, for example Raney nickel or palladium carbon. Since the reduction comes to a partial stop at the Schiff's base, it is advantageous to continue the reduction with sodium borohydride to convert the unreduced share of the Schiff's base completely into the decahydroquinoline.

The reactions of the present invention are preferably performed with starting materials that give rise to the preferred products mentioned above.

The starting materials are known or can be prepared in the known manner, see for example, German Auslegeschrift 1,143,511 and Horning et al. A.C.S. vol. 74, pages 773–5.

The 2-(γ-aminopropyl)-4-R'-4-R-cyclohexanones used as starting materials can be prepared, for example in the form of their salts, by reducing a 2-(β-cyanoethyl)-4-R'-4-R-cyclohexanone in the presence of an acid.

2 - (β - cyanoethyl) - 4 - R' - 4 - R - cyclohexanones can be prepared, for example, by condensing a 1-Z-4-R'-4-R-cyclohexene (where Z is an amino group, for example a pyrrolidino group), for example a 1-pyrrolidino-4-phenyl-4-cyanocyclohexene, with acrylonitrile and hydrolyzing the resulting aminocyclohexene to the cyclohexanone and, if desired or required, modifying the cyano group in position 4, for example by one of the methods described above.

The new compounds may be mixtures of their cis- and trans-modifications, pure cis-modifications, or pure trans-modifications (racemates), or optical antipodes. Mixtures of cis- and trans-modifications can be resolved into the pure cis- and trans-constituents by taking advantage of physical differences, in known manner, for example, by chromatography and/or fractional crystallization.

Racemic starting, intermediate and final products can be resolved into their optical antipodes by known methods, for example in the following manner: The racemic base is dissolved in a suitable inert solvent, reacted with an optically active acid and the resulting salts are resolved, for example on the strength of their different solubilities, into the diastereomers from which the antipodes of the new bases can be liberated by treatment with alkaline agents. Particularly frequently used optically active acids are the D- and L-forms of tartaric acid, di-ortho-toluyltartaric, malic, mandelic, camphorsulfonic or quinic acid. Alternatively, the separation can be performer, for example, by recrystallization of the resulting pure racemate from an optically active solvent. Advantageously, the more active of the two antipodes is isolated.

The new compounds may be used, for example, in the form of pharmaceutical preparations containing them in the free form or in the form of their salts, in conjunction or admixture with an organic or inorganic, solid or liquid pharmaceutical excipient suitable for enteral or parenteral administration. Suitable excepients are substances that do not react with the new compounds, for example water, gelatin, lactose, starches, stearyl alcohol, magnesium stearate, talcum, vegetable oils, benzyl alcohols, gums, propyleneglycols, white petroleum jelly or other known medicinal excipients. The pharmaceutical preparations may be, for example, tablets, dragees or capsules, or in liquid form solutions, suspensions or emulsions. They may be sterilized and/or may contain auxiliaries such as preserving, stabilizing, wetting or emulsifying agents, salts for regulating the osmotic pressure or buffers. They may also contain other therapeutically valuable substances. The pharmaceutical preparations are formulated by known methods.

The new compounds may also be used in veterinary medicine, for example in one of the forms mentioned above or in the form of feedingstuffs or additives to feedingstuffs, using, for example, the conventional extenders and diluents or feedingstuffs respectively.

The following examples illustrate the invention.

Example 1

27.5 g. of 2-(β-cyanoethyl)-4-cyano-4-phenyl-cyclohexanone (0.11 mol) are hydrogenated in one liter of methanol in the presence of 10.8 g. of Raney nickel. When 6770 ml. of hydrogen (=92% of theory) have been absorbed, the hydrogenation comes to a standstill. The catalyst is filtered off, the filtrate evaporated and the residue dissolved in 500 ml. of methanol and further reduced with 25 g. of sodium borohydride. The solution is poured into 2 liters of water, and the resulting aqueous solution extracted with 2× 100 ml. of chloroform. The chloroform extracts are washed with 500 ml. of water, combined, dried over sodium sulfate and evaporated. The resulting yellow oil is dissolved in 500 ml. of toluene and extracted with 3× 250 ml. of 2 N-hydrochloric acid. The hydrochloric solutions are washed with toluene, rendered strongly alkaline with 6 N-sodium hydroxide solution and extracted with 3× 500 ml. of chloroform. The chloroform solutions are combined, washed with water, dried over sodium sulfate and evaporated. On distillation in a high vacuum the residue yields trans-6-cyano-6-phenyl-decahydroquinoline of the formula

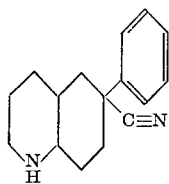

which passes over at 142° to 145° C. under 0.045 mm. Hg pressure. The methane-sulfonate is prepared in the usual manner; it melts at 232 to 234° C.

The 2-(β-cyanoethyl)-4-cyano-4-phenylcyclohexanone used as starting material can be prepared in the following manner.

A solution of 36 g. (0.18 mol) of 4-cyano-4-phenyl-cyclohexanone in 800 ml. of absolute benzene is mixed with 30 ml. (0.36 mol) of pyrrolidine and refluxed for 15 hours, while removing the water of reaction with the aid of a water separator. The benzene is evaporated, first under atmospheric pressure and then in a water-jet vacuum. The residual, oily 1-pyrrolidino-4-cyano-4-phenylcyclohexene is dissolved in 600 ml. of dioxane and mixed with 75 ml. of acrylonitrile and 1 g. of hydroquinone. The clear solution is then refluxed for 20 hours, while adding 15 ml. of acrylonitrile each dropwise after 5 hours and after 10 hours.

To hydrolyze the resulting 1-pyrrolidino-2-(β-cyanoethyl)-4-cyano-4-phenylcyclohexene 200 ml. of water are added, the mixture is refluxed for one hour and then evaporated under vacuum. The residue is dissolved in toluene. The toluene solution is washed with 1× 350 ml. of N-hydrochloric acid, 2× 350 ml. of cold 2 N-sodium hydroxide solution and 3× 350 ml. of water. The aqueous phases are again extracted with 500 ml. of toluene. The organic phases are combined, dried over sodium sulfate and evaporated under vacuum. The residual, brown oil yields on fractional distillation 2-(β-cyanoethyl)-4-cyano-4-phenylcyclohexanone which boils at 200° to 208° C. under a pressure of 0.01 to 0.04 mm. Hg.

Example 2

A solution of 27.6 g. of 2-(β-cyanoethyl)-4-cyano-4-phenyl-cyclohexanone in 1 liter of ethanol is hydrogenated with the use of 10.8 g. of Raney nickel under atmospheric pressure at 40° C. After about 38 hours, 92% of the theoretical quantity of hydrogen have been combined and hydrogenation ceases. The solution is freed from the catalyst by filtration, then evaporated. The residual yellow oil is dissolved in 500 ml. of methanol and reduced with sodium borohydride for 1 hour at room temperature and then for 20 minutes under reflux.

For working up, 250 ml. of methanol are distilled off under vacuum, the methanolic solution diluted with 1 liter of water and extracted with 2× 500 ml. of chloroform; the organic phases are combined, dried, suction-filtered, and the filtrate evaporated. The oily residue is dissolved in 500 ml. of toluene and extracted with N-hydrochloric acid, the hydrochloric extracts given a pH of 13 with sodium hydroxide solution, and extracted with chloroform. The chloroformic extracts are dried over sodium sulfate. The oil which remains behind when the chloroform has been evaporated is distilled under a high vacuum. A mixture of cis-6-cyano-6-phenyl-decahydroquinoline and trans-6-cyano-6-phenyl-decahydroquinoline is obtained which boils at 180–190° C. under a pressure of 0.2–0.15 mm. of Hg.

The mixture is dissolved in 100 ml. of acetone, and the salt precipitated by the dropwise addition of 4.93 ml. of methane sulfonic acid. In this manner, the pure trans-6-cyano-6-phenyl-decahydroquinoline methanesulfonate of melting point 232–234° C. is obtained.

According to the thin-layer chromatogram (system, chloroform, staturated with ammonia; carrier, silica gel; indicator, iodine), the compound is uniform, and free from the cis-modification.

The mother liquor is evaporated under vacuum, the residue dissolved in 500 ml. of water, and extracted with 2× 200 ml. of toluene. The aqueous phase is given a pH of 13 with 6 N-sodium hydroxide solution at 0° C., and the precipitated base is extracted with 3× 300 ml. of chloroform. The chloroformic extracts are washed with 2× 300 ml. of water, dried over sodium sulfate, filtered with suction, and evaporated. The residue is dissolved in a small amount of toluene+hexane (2:1) and chromatographed over 600 g. of alumina (activity II, neutral). There are used as eluant (a) 1 liter of toluene+hexane (2:1), (b) 3 liters of toluene+hexane (2+1), and (c) 3 liters of toluene. Fractions (b) and (c) yield pure cis-6-cyano-6-phenyl-decahydroquinoline.

The resulting free base is dissolved in ethyl acetate, and a solution of hydrochloric acid in ethyl acetate added to precipitate the crystalline hydrochloride of melting point 249–251° C.

The IR spectrum of the base in methylene chloride reveals inter alia a characteristic band at 4.5μ (C≡N band).

According to the thin-layer chromatogram, (system, chloroform, saturated with ammonia, or chloroform, saturated with ammonia, +toluene 1:1, carrier, silicagel; indicator, iodine), the free base is uniform and free from the trans-modification.

In an analogous manner to that described above there may be prepared the trans-6-cyano-6-(meta-methoxyphenyl)-decahydroquinoline hydrochloride (M.P. 252–253° C.) and the cis-6-cyano-6-(meta-methoxy-phenyl)-decahydroquinoline hydrochloride (M.P. 230–233° C.).

Example 3

30 g. of a mixture of cis-6-phenyl-6-cyano-decahydroquinoline and trans-6-phenyl-6-cyano-decahydroquinoline are dissolved in 670 ml. of 98% formic acid. 16.7 ml. of 40% Formalin solution are added dropwise to the solution which is then refluxed for 7 hours. The excess formic acid is evaporated under vacuum. The residue is dissolved in water, and the solution extracted twice with toluene. The aqueous solution is given a pH of 13 by the addition at 0° C. of aqueous sodium hydroxide solution, then extracted with 3× 300 ml. of chloroform. The chloroformic solution is washed with 2× 300 ml. of water, dried over sodium sulfate, filtered with suction, and the filtrate evaporated under vaccum. The residue is distilled under a high vacuum and yields a mixture of cis-1-methyl-6-phenyl-6-cyano-decahydroquinoline and trans-1-methyl-6-phenyl-6-cyano-decahydroquinoline, boiling point, 185° C. under 0.3 mm. Hg pressure. The mixture is dissolved in 25 ml. of isopropanol, and the trans-1-methyl-6-phenyl-6-cyanodecahydroquinoline hydrochloride precipitated by the dropwise addition of a solution of hydrochloric acid in ethyl acetate. Melting point 241–243° C.

According to the thin-layer chromatogram (system, chloroform, saturated with ammonia, +toluene (1:1); carrier, silica gel; indicator, iodine), this hydrochloride is uniform and free from the cis-modification.

Analogously, reaction of trans-6-phenyl-6-cyanodecahydroquinoline with formic acid and formalin yields the trans-1-methyl-6-phenyl-6-cyano-decahydroquinoline hydrochloride which is identical with that described above.

The above ethyl acetate/isopropanol mother liquor is evaporated under vacuum. The residue is dissolved in water, and the solution extracted twice with toluene. At 0° C., the aqueous solution is given a pH of 13 by the addition of aqueous sodium hydroxide solution, and then extracted with 3× 300 ml. of chloroform. The chloroformic solution is washed with 2× 300 ml. of water, dried over sodium sulfate, suction filtered, and the filtrate evaporated under vacuum. The residue is dissolved in a small amount of toluene, and the solution chromatographed over 300 g. of alumina (activity II, neutral). The first two fractions are eluted with 500 ml. of toluene each and yield the pure cis-1-methyl-6-phenyl-6-cyanodecahydroquinoline. Dissolution of the base in ethyl acetate and treatment of the solution with a solution of hydrochloric acid in ethyl acetate gives the hydrochloride of melting point 253–254° C. which is uniform according to the thin layer chromatogram (system, chloroform, saturated with ammonia, +toluene 1:5; carrier, silica gel; indicator, iodine).

Example 4

37.4 g. of a mixture of cis-6-phenyl-6-cyano-decahydroquinoline and trans-6-phenyl-6-cyano-decahydroquinoline in 350 ml. of acetone are refluxed with 20.8 g. of benzyl chloride, 43 g. of potassium carbonate, and 0.5 g. of potassium iodide for 15 hours, then freed from inorganic salts by filtration with suction. The filtrate is evaporated, the residue dissolved in 500 ml. of chloroform, and washed with 2× 250 ml. of water, dried over sodium sulfate, filtered with suction, and the filtrate evaporated. The resulting oil is dissolved in 500 ml. of acetone, and the trans-1-benzyl-6-phenyl-6-cyano-decahydroquinoline hydrochloride of melting point 276–278° C. precipitated by the dropwise addition of a solution of hydrochloric acid in ethyl acetate.

According to the thin-layer chromatogram (system, chloroform, saturated with ammonia, +toluene 1:3; carrier, silica gel; indicator, iodine), the compound is uniform and free from the cis-modification.

The mother liquor is evaporated. The residue is dissolved in water, and the solution extracted twice with toluene. At 0° C., the aqueous solution is given a pH of 13 with aqueous sodium hydroxide solution, and extracted with 3× 300 ml. of chloroform. The chloroformic solution is washed with 2× 300 ml. of water, dried over sodium sulfate, filtered with suction, and the filtrate evaporated under vacuum. The residue is dissolved in a small amount of toluene, and chromatographed over 600 g. of alumina (activity II, neutral). The first fraction, eluated with 1 liter of toluene, yields the pure cis-1-benzyl-6-phenyl-6-cyano-decahydroquinoline. The compound is dissolved in ethyl acetate and the solution treated with a solution of hydrochloric acid in ethyl acetate. In this manner, cis-1-benzyl-6-phenyl-6-cyano - decahydroquinoline hydrochloride of melting point 220–221° is obtained.

According to the thin-layer chromatogram, this compound is uniform and free from the trans-modification.

Analogous benzylation of cis-6-phenyl-6-cyano-decahydroquinoline also yields the cis-1-benzyl - 6 - phenyl-6-cyano-decahydroquinoline hydrochloride which is identical with the afore-described cis-hydrochloride.

Analogous benzylation of trans-6-phenyl-6-cyano-decahydroquinoline also yields the trans-1-benzyl-6-phenyl-6-cyano-decahydroquinoline hydrochloride which is identical with the afore-described trans-hydrochloride.

Example 5

0.6 g. of trans - 1 - benzyl - 6 - phenyl - 6 - cyano-decahydroquinoline are dissolved in 50 ml. of methanol and hydrogenated in the presence of 0.3 g. of 10% palladium carbon. When the calculated quantity of hydrogen has been combined, the catalyst is filtered off, and the filtrate evaporated. The residue is dissolved in water and the solution extracted twice with toluene. At 0° C. the aqueous solution is given a pH of 13 with aqueous sodium hydroxide solution and extracted with 3× 300 ml. of chloroform. The choloroformic solution is washed with 2× 300 ml. of water, dried over sodium sulfate, filtered with suction, and the filtrate evaporated under vacuum. The trans-6-phenyl-6-cyano-decahydroquinoline is obtained which according to the thin-layer chromatogram is identical with the trans-compound obtained according to Example 2.

Example 6

5.5 g. of cis-1-benzyl-6-phenyl-6-cyano-decahydroquinoline are hydrogenated in 200 ml. of methanol in the presence of 1 g. of 10% palladium carbon. When the calcuated quantity of hydrogen has been combined, the catalyst is filtered off and the filtrate evaporated. The residue is dissolved in water, and the solution extracted twice with toluene. At 0° C. the aqueous solution is given a pH of 13 with aqueous sodium hydroxide solution, and then extracted with 3× 300 ml. of chloroform. The chloroformic solution is washed with 2× 300 ml. of water, dried over sodium sulfate, filtered with suction, and the filtrate evaporated under vacuum. The cis-6-phenyl-6-cyano-decahydroquinoline is obtained which according to the thin-layer chromatogram is identical with the cis-compound obtained according to Example 2.

Example 7

10.2 g. of trans-1-methyl-6-phenyl-6-cyano-decahydroquinoline hydrochloride are dissolved in 16 ml. of ethanol, the solution treated with 14.17 g. of 96% sulfuric acid, 1.90 ml. of water, and 2.18 g. of ammonium chloride and heated in an autoclave at 150° C. for 8 hours. The dark brown oil is dissolved in water, the aqueous solution extracted with 2× 100 ml. of toluene, and at 0° C. given a pH value of 11 with saturated sodium carbonate solution, then extracted with 3× 400 ml. of chloroform. The organic phases are washed with 2× 200 ml. of water, dried over sodium sulfate, filtered with suction, and the filtrate evaporated. The resulting brown oil is dissolved in a small amount of toluene and the solution chromatographed over 160 g. of alumina (activity II, neutral). The eluant used is 3.5 liters of toluene. This first fraction yields the trans-1-methyl-6-phenyl-6-carbethoxy-decahydroquinoline.

The hydrochloride crystallizes from ethyl acetate and melts at 189–192° C. Thin-layer chromatography reveals that the compound is uniform.

Example 8

A solution of 12.2 g. of trans-1-benzyl-6-phenyl-6-cyano-decahydroquinoline hydrochloride in 24.4 ml. of methanol is treated with 13.71 g. of 96% sulfuric acid, 1.88 ml. of water, and 2.09 g. of ammonium chloride, then heated at 150° C. in an autoclave for 8 hours. The reaction mixture is dissolved in water, the aqueous solution extracted with 2× 100 ml. of toluene, and 0° C. given a pH value of 11 with saturated sodium carbonate solution, and extracted with 3× 400 ml. of chloroform. The organic phases are washed twice with 200 ml. of water each time, dried over sodium sulfate, filtered with suction, and the filtrate evaporated. The resulting base is dissolved in a small amount of toluene, and chromatographed on 500 g. of alumina (activity II, neutral). The first fractions, eluated with 2.5 liters of toluene and 4 liters of toluene+chloroform 4:1, yield the trans-1-benzyl-6-phenyl-6-carbomethoxy-decahydroquinoline. By dissolving it in ethyl acetate and treating the solution with a solution of hydrochloric acid in ethyl acetate, the trans-1-benzyl-6-phenyl-6-carbomethoxy - decahydroquinoline hydrochloride is obtained in crystalline form. Melting point, 248° C.

Example 9

5.1 g. of trans-1-benzyl-6-phenyl-6-carbomethoxy-decahydroquinoline hydrochloride are dissolved in 300 ml. of methanol, and hydrogenated in the presence of 1 g. of 10% palladium carbon. The solution is filtered to remove the catalyst, then evaporated. The residue is dissolved in water and the solution extracted twice with toluene. At 0° C., the aqueous solution is given a pH of 13 with aqueous sodium hydroxide solution, then extracted with 3× 300 ml. of chloroform. The chloroformic solution is washed with 2× 300 ml. of water, dried over sodium sulfate, filtered with suction, and the filtrate evaporated under reduced pressure. The residue is dissolved in ethyl acetate and treated with a solution of hydrochloric acid in ethyl acetate. The trans-6-phenyl-6-carbomethoxy-decahydroquinoline hydrochloride of melting point 207–209° C. is obtained in this manner. According to the thin-layer chromatogram, the hydrochloride is uniform.

Example 10

A solution of 10.5 g. of trans-1-methyl-6-phenyl-6-cyano-decahydroquinoline hydrochloride in 26.25 ml. of methanol is treated with 14.8 ml. of 96% sulfuric acid, 2.07 ml. of water, and 2.28 g. of ammonium chloride, and heated in an autoclave at 150° C. for 8 hours. The reaction mixture is dissolved in water, the aqueous solution extracted with 2× 100 ml. of toluene and at 0° C. the pH value is adjusted to 11 with saturated sodium carbonate solution, and the batch then extracted with 3× 400 ml. of chloroform. The organic phases are washed with 2× 200 ml. of toluene and at 0° C. the pH value is adjusted to 11 with saturated sodium carbonate solution, and the batch then extracted with 3× 400 ml. of chloroform. The organic phases are washed with 2× 200 ml. of water, dried over sodium sulfate, filtered with suction, and the filtrate evaporated. The resulting base is dissolved in a small quantity of toluene and chromatographed on 200 g. of alumina (activity II, neutral). The first fractions, eluated with 2 liters of toluene and 2 liters of toluene+chloroform 4:1, yield the trans-1-methyl-6-phenyl-6-carbomethoxy-decahydroquinoline. Dissolution in ethyl acetate and treatment with a solution of hydrochloric acid in ethyl acetate give the trans-1-methyl-6-phenyl-6-carbomethoxy-decahydroquinoline hydrochloride of melting point 219–221° C. According to the thin-layer chromatogram, the compound is uniform.

Example 11

5.3 g. of cis-1-benzyl-6-phenyl-6-cyano-decahydroquinoline hydrochloride are dissolved in 10.4 ml. of methanol, and the solution boiled at 150° C. for 8 hours with 5.84 g. of 96% sulfuric acid, 0.8 ml. of water, and 0.88 g. of ammonium chloride. The reaction mixture is dissolved in water, the aqueous solution extracted with 2× 100 ml. of toluene, and at 0° C. the pH value is adjusted to 11 with saturated sodium carbonate solution, and the batch then extracted with 3× 400 ml. of chloroform. The organic phases are washed with 2× 200 ml. of water, dried over sodium sulfate, filtered with suction, and the filtrate evaporated. The crude base so obtained is dissolved in a small amount of toluene and the solution chromatographed over 300 g. of alumina (activity II, neutral). The first fractions, eluted with 1.5 liters of toluene, yield the cis-1-benzyl-6-phenyl-6-carbomethoxy-decahydroquinoline. When this compound is dissolved in ethyl acetate and treated with a solution of hydrochloric acid in ethyl acetate, and ether is added, the cis-1-benzyl-6 - phenyl - 6 - carbomethoxy-decahydroquinoline hydrochloride of melting point 171–173° C. is obtained. Thin-layer chromatography shows the compound to be uniform.

Example 12

5.9 g. of cis-1-benzyl-6-pehnyl-6-carbomethoxy-decahydroquinoline are dissolved in 300 ml. of methanol and, by the addition of the calculated quantity of methanolic hydrochloric acid, converted into the hydrochloride. To this solution are added 2 g. of 10% palladium carbon and the batch hydrogenated under atmospheric pressure. The catalyst is removed by filtration and the solution evaporated. The residue is dissolved in water and the solution extracted twice with toluene. At 0° C., the pH is adjusted to 13 by addition of aqueous sodium hydroxide solution, and the batch extracted with 3× 300 ml. of chloroform. The chloroformic solution is washed with 2× 300 ml. of water, dried over sodium sulfate, filtered with suction, and the filtrate evaporated under vacuum. The residue is dissolved in acetone, and the calculated quantity of methane sulfonic acid added. In this manner, the cis - 6 - phenyl-6-carbomethoxy-decahydroquinoline-methane sulfonate of melting point 261–265° C. is obtained. According to the thin-layer chromatogram the methane sulfonate is uniform.

Example 13

A solution of 21.3 g. of trans-1-benzyl-6-phenyl-6-cyano-decahydroquinoline in 34.2 ml. of ethanol is boiled for 8 hours at 150° C. in an autoclave with 26.5 g. of 96% sulfuric acid, 3.55 ml. of water, and 3.77 g. of ammonium chloride. The reaction mixture is dissolved in water, the aqueous solution extracted with 2× 100 ml. of toluene, and at 0° C. the pH value adjusted to 11 with a saturated sodium carbonate solution, then extracted with 3× 400 ml. of chloroform. The organic phases are washed with 2× 200 ml. of water, dried over sodium sulfate, filtered with suction, and the filtrate evaporated. The residue is dissolved in a small quantity of toluene and chromatographed over 500 g. of alumina (activity II, neutral). The first fractions, eluted with 3.5 liters of toluene and 1 liter of toluene+chloroform 3:1 yield the trans - 1 - benzyl - 6 - phenyl - 6 - carbethoxy-decahydroquinoline.

Example 14

A solution of 9.2 g. of trans-1-benzyl-6-phenyl-6-carbethoxy-decahydroquinoline in ethanol is treated with the calculated quantity of ethanolic hydrochloric acid. 2.5 g. of 10% palladium carbon are then added, and the batch is hydrogenated under atmospheric pressure. The catalyst is filtered off and the filtrate evaporated. The reaction mixture is dissolved in water, the aqueous solution extracted with 2× 100 ml. of toluene, and at 0° C. the pH adjusted to 11 with a saturated sodium carbonate solution, and the batch extracted with 3× 400 ml. of chloroform. The organic phases are washed with 2× 200 ml. of water, dried over sodium sulfate, filtered with suction, and the filtrate evaporated. The residue is dissolved in acetone and the solution treated with a solution of hydrochloric acid in ethyl acetate to obtain trans-6-phenyl-6-carbethoxy-decahydroquinoline hydrochloride melting at 227–229° C.

According to the thin-layer chromatogram, the compound is uniform.

Example 15

To a suspension of 3.48 g. of magnesium chips in 30 ml. of absolute ether are added dropwise under nitrogen 13.90 g. (0.126 mol) of ethyl bromide in such manner that the mixture always gently boils under reflux. When all ethyl bromide has been added, the batch is refluxed for another 30 minutes. 18.0 g. of trans-1-methyl-6-cyano-6-phenyl-decahydroquinoline, dissolved in 200 ml. of toluene, are then added to the ethereal solution. The reaction mixture is refluxed for 4 hours. While still warm, the reaction mixture is added to 600 ml. of 2 N-hydrochloric acid, and the mixture refluxed for 2 hours while being stirred vigorously. After cooling to room temperature, the phases are separated, and the aqueous solution extracted twice with toluene. At 0° C. the aqueous solution is given a pH of 13 with aqueous sodium hydroxide solution, then extracted with 3× 300 ml. of chloroform. The chloroformic solution is washed with 2× 300 ml. of water, dried over sodium sulfate, filtered with suction, and the filtrate evaporated under vacuum. The residue is dissolved in a small amount of toluene and the solution chromatographed over 500 g. of alumina (activity II, neutral). The first fractions, eluted with 7.0 liters of toluene yield the trans-1-methyl-6-phenyl-6-propionyl-decahydroquinoline.

When the base is dissolved in ethyl acetate and the solution treated with a solution of hydrochloric acid in ethyl acetate, the trans-1-methyl-6-phenyl-6-propionyl-decahydroquinoline hydrochloride of melting point 233–235° C. is obtained.

According to the thin-layer chromatogram, the compound is uniform.

Example 16

To a suspension of 3.84 g. of magnesium chips in 35 ml. of absolute ether, 15.48 g. of ethyl bromide are added dropwise in such manner under nitrogen that the mixture keeps gently boiling under reflux. When all ethyl bromide has been added, refluxing is continued for another 30 minutes. 26.0 g. of trans-1-benzyl-6-phenyl-6-cyano-decahydroquinoline in 350 ml. of absolute toluene are then added dropwise to the ethereal solution. The reaction mixture is refluxed for 4 hours. While still warm, the reaction mixture is added to 600 ml. of 2 N-hydrochloric acid, and the mixture refluxed for 2 hours while being stirred vigorously. After cooling to room temperature, the phases are separated, and the aqueous solution extracted twice with toluene. The aqueous solution, at 0° C., is given a pH of 13 by the addition of aqueous sodium hydroxide solution, then extracted with 3× 300 ml. of chloroform. The chloroformic solution is washed with 2× 300 ml. of water, dried over sodium sulfate, filtered with suction, and the filtrate evaporated under reduced pressure. The residue is disolved in a small amount of toluene and the solution chromatographed over 600 g. of alumina (activity II, neutral). The first fractions, eluated with 5 liters of toluene, yield trans-1-benzyl-6-phenyl-6-propionyl-decahydroquinoline.

Example 17

15.5 g. of trans-1-benzyl-6-phenyl-6-propionyl-decahydroquinoline are dissolved in 200 ml. of methanol and the solution treated with the calculated quantity of methanolic hydrochloric acid. After the addition of 6 g. of 10% palladium carbon, the batch is hydrogenated under atmospheric pressure. The catalyst is removed by filtration, and the filtrate evaporated. The residue is dissolved in water, the aqueous solution extracted with 2× 100 ml. of toluene, and at 0° C. the pH adjusted to 11 with a saturated sodium carbonate solution, and the batch then extracted with 3×400 ml. of chloroform. The organic phases tracted with 3× 400 ml. of chloroform. The organic phases are washed with 2× 200 ml. of water, dried over sodium sulfate, filtered with suction, and the filtrate evaporated. the residue is dissolved in isopropanol and the solution treated with isopropanolic hydrochloric acid. There is obtained the trans-6-phenyl-6-propionyl-decahydroquinoline hydrochloride of felting point 270–272° C.

The thin-layer chromatogram reveals the hydrochloride to be uniform.

Example 18

Tablets containing 25 mg. of trans-6-cyano-6-phenyl-decahydroquinoline methanesulfonate and, for example, the following ingredients can be prepared:

| | Mg. |
|---|---|
| Trans-6-cyano-6-phenyl-decahydroquinoline methanesulfonate | 25.0 |
| Wheat starch | 40.0 |
| Lactose | 45.0 |
| Colloidal silicic acid | 5.0 |
| Arrowroot | 15.0 |
| Talc | 9.0 |
| Magnesium stearate | 1.0 |
| | 140.0 |

Preparation

The trans-6-cyano-6-phenyl-decahydroquinoline methanesulfonate is mixed with part of the wheat starch, with lactose, and colloidal silicic acid, and the mixture passed through a sieve. The remaining wheat starch is pasted with the five-fold quantity of water on the water bath, and the powder mixture kneaded with this paste until a slightly plastic mass is obtained.

The plastic mass is forced through a sieve with a mesh width of about 3 mm., dried, and the dry granulate forced through a sieve. After that, the arrowroot, talc and magnesium stearate are admixed, and the resulting mixture compressed into tablets of 140 mg. each.

What is claimed is:

1. A member selected from the group consisting of compounds of the formula

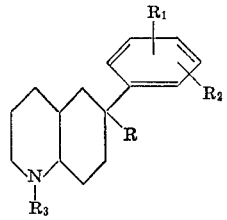

in which $R_1$ and $R_2$ each stands for a member selected from the group consisting of hydrogen, lower alkyl, lower alkoxy, halogen and trifluoromethyl, R stands for a member selected from the group consisting of cyano, carbo-lower alkoxy and lower alkanoyl and $R_3$ for a member selected from the group consisting of hydrogen, lower alkyl and benzyl, and pharmaceutically acceptable acid addition salts thereof.

2. A member selected from the group consisting of compounds of the formula

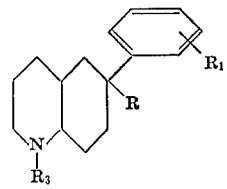

having the trans-configuration, in which $R_1$ stands for a member selected from the group consisting of hydrogen, lower alkyl, lower alkoxy, halogen and trifluoromethyl, R stands for a member selected from the group consisting of cyano, carbo-lower-alkoxy and lower alkanoyl and $R_3$ for a member selected from the group consisting of hydrogen and lower alkyl, and pharmaceutically acceptable acid addition salts thereof.

3. A member selected from the group consisting of trans-6-cyano-6 - phenyl - decahydroquinoline and its pharmaceutically acceptable acid addition salts.

4. A member selected from the group consisting of cis-6-cyano-6-phenyl-decahydroquinoline and its pharmaceutically acceptable acid addition salts.

5. A member selected from the group consisting of trans-1-methyl-6-cyano-6-phenyl-decahydroquinoline and its pharmaceutically acceptable acid addition salts.

6. A member selected from the group consisting of cis-1-methyl-6-cyano-6-phenyl-decahydroquinoline and its pharmaceutically acceptable acid addition salts.

7. A member selected from the group consisting of trans-1-benzyl-6-cyano-6-phenyl - decahydroquinoline and its pharmaceutically acceptable acid addition salts.

8. A member selected from the group consisting of cis-1-benzyl-6-cyano-6-phenyl - decahydroquinoline and its pharmaceutically acceptable acid addition salts.

9. A member selected from the group consisting of trans-1-methyl-6-carbethoxy-6-phenyl - decahydroquinoline and its pharmaceutically acceptable acid addition salts.

10. A member selected from the group consisting of trans-1-benzyl-6-carbomethoxy-6-phenyl - decahydroquinoline and its pharmaceutically acceptable acid addition salts.

11. A member selected from the group consisting of cis-1-benzyl-6-carbomethoxy-6-phenyl - decahydroquinoline and its pharmaceutically acceptable acid addition salts.

12. A member selected from the group consisting of trans-6-carbomethoxy - 6 - phenyl - decahydroquinoline and its pharmaceutically acceptable acid addition salts.

13. A member selected from the group consisting of cis - 6 - carbomethoxy-6-phenyl - decahydroquinoline and its pharmaceutically acceptable acid addition salts.

14. A member selected from the group consisting of trans - 1 - methyl-6-carbomethoxy-6-phenyl - decahydroquinoline and its pharmaceutically acceptable acid addition salts.

15. A member selected from the group consisting of trans - 1 - benzyl - 6 - carbethoxy - 6 - phenyl - decahydroquinoline and its pharmaceutically acceptable acid addition salts.

16. A member selected from the group consisting of trans-6-carbethoxy-6-phenyl - decahydroquinoline and its pharmaceutically acceptable acid addition salts.

17. A member selected from the group consisting of trans - 1 - methyl-6propionyl-6-phenyl - decahydroquinoline and its pharmaceutically acceptable acid addition salts.

18. A member selected from the group consisting of trans - 1 - benzyl-6-propionyl-6-phenyl - decahydroquinoline and its pharmaceutically acceptable acid addition salts.

19. A member selected from the group consisting of trans - 6 - propionyl-6-phenyl - decahydroquinoline and its pharmaceutically acceptable acid addition salts.

20. A member selected from the group consisting of trans-6-cyano - 6 - (meta - methoxyphenyl) - decahydroquinoline and its pharmaceutically acceptable acid addition salts.

21. A member selected from the group consisting of cis - 6 -cyano-6-(meta-methoxyphenyl) - decahydroquinoline and its pharmaceutically acceptable acid addition salts.

References Cited

Fieser et al., Adv. Organic Chemistry, Reinhold (1961), p. 52.

ALTON D. ROLLINS, *Primary Examiner.*

D. DAUS, *Assistant Examiner.*

U.S. Cl. X.R.

260—287, 283, 690, 464, 563, 326.8, 289; 167—65, 53; 99—2